United States Patent
Blackwell et al.

(10) Patent No.: US 9,184,575 B2
(45) Date of Patent: Nov. 10, 2015

(54) ENTRY TOOL AND METHODS FOR USE FOR TUBES OR CABLES

(75) Inventors: Tony Blackwell, Research Triangle Park, NC (US); David Squires, Research Triangle Park, NC (US); Manuel A. Santos, Meriden, CT (US)

(73) Assignees: Sumitomo Electric Lightwave Corp., Research Triangle Park, NC (US); Ripley Tools LLC, Cleveland, OH (US)

( * ) Notice: Subject to any disclaimer, the term of this patent is extended or adjusted under 35 U.S.C. 154(b) by 208 days.

(21) Appl. No.: 13/328,807

(22) Filed: Dec. 16, 2011

(65) Prior Publication Data

US 2013/0152758 A1 Jun. 20, 2013

(51) Int. Cl.
- B27B 11/00 (2006.01)
- H02G 1/12 (2006.01)
- B26D 3/00 (2006.01)
- B26D 7/26 (2006.01)

(52) U.S. Cl.
CPC .............. *H02G 1/1224* (2013.01); *B26D 3/001* (2013.01); *B26D 7/2628* (2013.01); *H02G 1/1204* (2013.01); *H02G 1/1217* (2013.01); *H02G 1/1234* (2013.01); *Y10T 83/667* (2015.04)

(58) Field of Classification Search
USPC ........ 30/62.5, 94, 98, 92.5, 90.4, 90.6; 7/107, 7/157
See application file for complete search history.

(56) References Cited

U.S. PATENT DOCUMENTS

| | | | | |
|---|---|---|---|---|
| 552,490 A | * | 12/1895 | Benecke | 30/90.9 |
| 1,866,095 A | * | 7/1932 | Foley | 30/90.7 |
| 2,538,453 A | * | 1/1951 | Harkins | 30/90.9 |
| 2,830,366 A | * | 4/1958 | Chisena | 30/90.7 |
| 3,043,004 A | * | 7/1962 | Walter | 30/92.5 |
| 3,093,023 A | * | 6/1963 | Vail | 83/370 |
| 4,472,877 A | * | 9/1984 | Undin et al. | 30/90.7 |
| D301,970 S | | 7/1989 | Matthews | |
| 4,945,788 A | * | 8/1990 | Matthews | 81/9.4 |
| 4,955,137 A | | 9/1990 | Matthews | |
| 4,977,671 A | * | 12/1990 | Ducret | 30/90.2 |
| 5,182,859 A | * | 2/1993 | Yoshimori | 30/90.6 |
| 5,305,529 A | | 4/1994 | Tarpill | |
| 6,131,289 A | | 10/2000 | Tarpill | |
| 6,427,331 B1 | | 8/2002 | Tarpill et al. | |
| 6,467,171 B2 | | 10/2002 | Tarpill | |
| 6,581,291 B1 | | 6/2003 | Tarpill et al. | |
| D477,521 S | | 7/2003 | Tarpill et al. | |
| D504,294 S | | 4/2005 | Tarpill | |
| D505,056 S | | 5/2005 | Tarpill et al. | |
| D515,901 S | | 2/2006 | Tarpill | |
| D649,847 S | | 12/2011 | Zagula | |

* cited by examiner

*Primary Examiner* — Omar Flores Sanchez (74) *Attorney, Agent, or Firm* — Jenkins, Wilson, Taylor & Hunt, P.A.

(57) ABSTRACT

Devices and methods are disclosed for gaining access to optical fibers contained within a fiber optic cable. Specifically, a cable entry tool can include a first jaw that can have a substantially V-shaped first channel formed therein, a first cutting element extending into the first channel and movable to any of a variety of depths, a second jaw positioned opposing the first jaw and that can have a substantially V-shaped second channel formed therein, and a second cutting element extending into the second channel and movable to any of a variety of depths. The first channel and the second channel can be movable with respect to each other for receiving therebetween a buffer tube having any of a variety of tube diameters.

21 Claims, 5 Drawing Sheets

ENTRY TOOL AND METHODS FOR USE FOR TUBES OR CABLES

TECHNICAL FIELD

The subject matter disclosed herein relates generally to devices and methods for gaining access to optical fibers contained within a fiber optic cable. More particularly, the subject matter disclosed herein relates to devices and methods for axially slitting and radially cutting fiber optic buffer tubes or cables having a variety of diameters in order to access optical fibers and ribbons without damaging the fibers.

BACKGROUND

Fiber optic cables are used to transmit information including telephone signals, television signals, data signals, and Internet communication. There are different types of fiber optic cables, and each type can require different tools for entry and fiber access. In particular, central tube ribbon cables are constructed with one or more internal component "central tubes" or "buffer tubes" that house the optical fiber ribbons within an external cable jacket. The number of fibers contained within such a cable can commonly range from 12 to 864 total fibers, with the range of fibers contained therein translating to a varying range of tube diameters. In addition, the thickness of the external jacket or buffer tube can likewise be varied, and additional material layers may be included within the cable or buffer tube based on considerations such as the particular application for the cable and expected operating conditions.

Despite this variety of cable types and sizes, however, a technician needs to be able to open the cable to be ready for fiber access. There are tools currently on the market that can open the central tube to access the fiber ribbons inside, but because such cables tend to be substantially round, tube entry for cables having a large range of tube diameters can be problematic for current fiber access tools. Specifically, these tools are generally made to encircle a round shaped tube and either have an inside diameter closely matching the tube outside diameter or utilize interchangeable dies or wheels to match the tube diameter.

Because of this configuration, a large tube cannot fit into a tool with a smaller die or insert. Conversely, a small tube cannot fit properly into a tool where the die or insert is too large because the tube will move within the tool die, and the cut will not be accurate enough to ensure that the blades cut at the proper depth. In addition, when manufacturers "optimize" their fiber optic cables, the cables can become smaller and thus change the central tube sizes. As a result, a variety of inserts, rollers, or tools may be needed to accommodate the wide variety of tube sizes a technician may encounter due to differences in fiber numbers or due to cable optimization.

As a result, it is desirable for a single entry tool to be able to accommodate tubes and cables having any of a variety of diameters without requiring specially-sized inserts, rollers, or tools be used.

SUMMARY

In accordance with this disclosure, devices and methods are disclosed for gaining access to optical fibers contained within a buffer tube of a fiber optic cable without damaging the fibers. In one aspect, a tube and cable entry tool is provided. The tube and cable entry tool can comprise a first jaw having a substantially V-shaped first channel formed therein, a first cutting element extending into the first channel and movable to any of a variety of depths, a second jaw positioned opposing the first jaw that can for example have a substantially V-shaped second channel formed therein, and a second cutting element extending into the second channel and movable to any of a variety of depths. In this configuration, the first channel and the second channel can be movable with respect to each other for receiving therebetween a buffer tube having any of a variety of tube diameters.

In another aspect, an entry tool can comprise a first grip handle having a first end and a second end and a second grip handle having a first end and a second end connected to the second end of the first grip handle. A first jaw can be connected to the first end of the first grip handle, and the first jaw can for example have a first channel formed therein. A first cutting element can extend into the first channel and can be movable to any of a variety of depths, the first cutting element being oriented substantially parallel with a long axis of the first grip handle. A second jaw can be connected to the first end of the second grip handle and can be positioned opposing the first jaw, and the second jaw can for example have a second channel formed therein. A second cutting element can extend into the second channel and can be movable to any of a variety of depths, the second cutting element being oriented substantially parallel with a long axis of the second grip handle. In this arrangement, the first channel and the second channel can be movable with respect to each other for receiving therebetween a buffer tube having any of a variety of tube diameters.

In yet another aspect, methods for gaining access to optical fibers contained within a fiber optic cable are provided. In one aspect for example, the method can comprise positioning a buffer tube or cable between a first jaw that can for example have a first channel formed therein and a second jaw that can for example have a second channel formed therein, the buffer tube being received by the first channel and the second channel. A first cutting element can be extended a first predetermined depth into the first channel, the first predetermined depth being selected based on characteristics of the buffer tube (e.g., diameter, wall thickness). Likewise, a second cutting element can be extended a second predetermined depth into the second channel, the second predetermined depth being selected based on characteristics of the buffer tube. The first jaw and the second jaw can be pressed together such that the first cutting element and the second cutting element penetrate at least an outer wall of the buffer tube. The buffer tube can be moved with respect to the first and second cutting elements to cut the outer wall of the buffer tube.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1A:
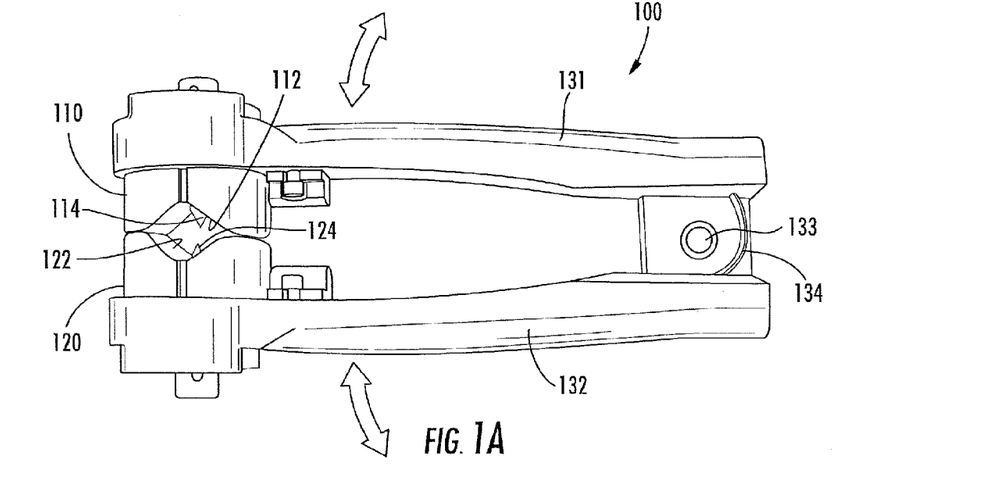
FIGS. 1A and 1B are side views of a tube and cable entry tool according to an embodiment of the presently disclosed subject matter.
Figure 1B:
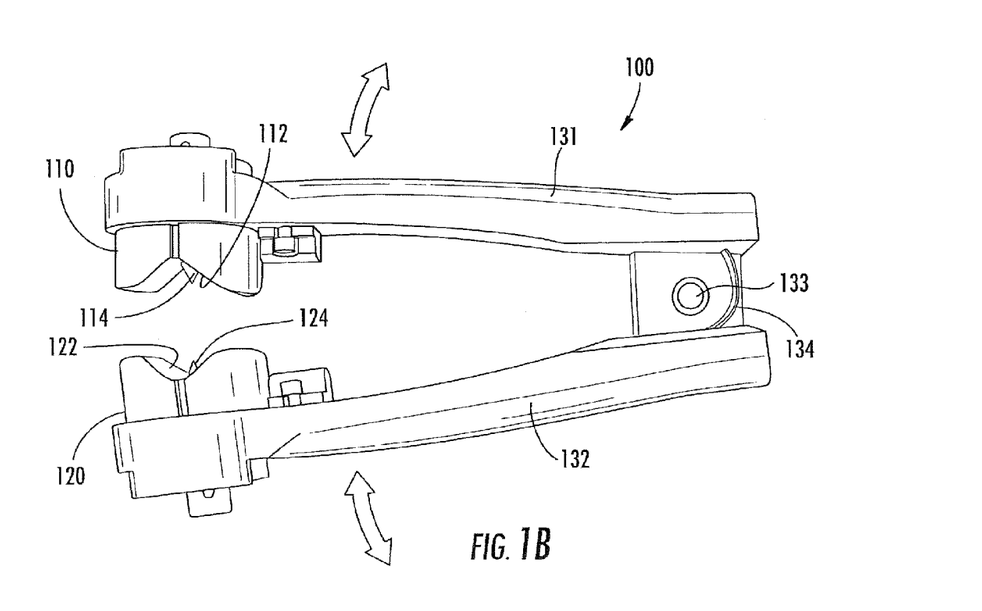
Figure 2:
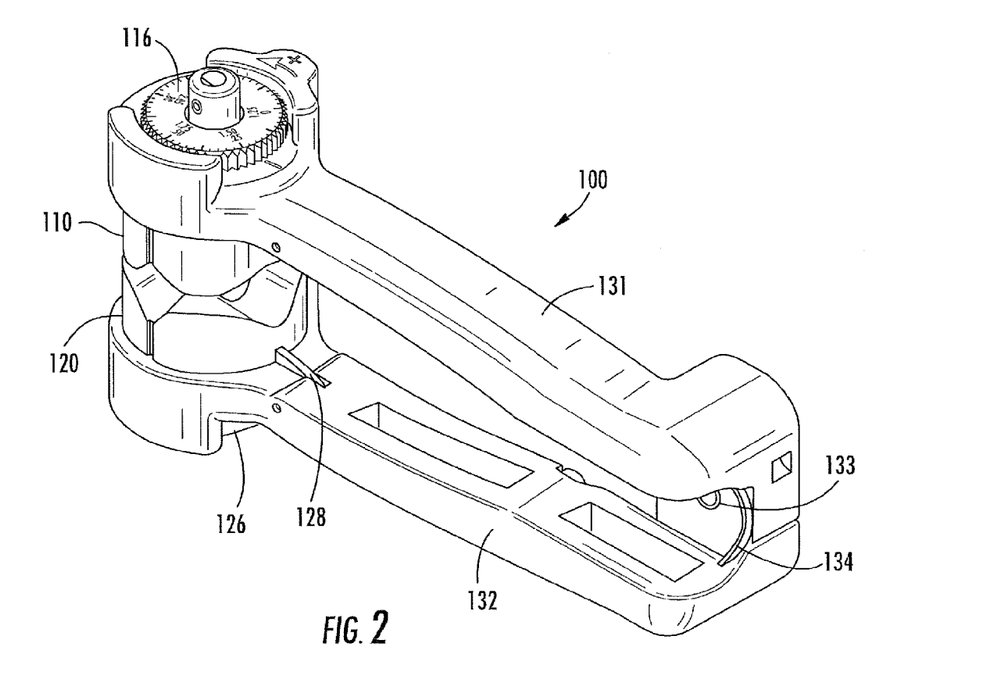
FIG. 2 is a perspective view of a tube and cable entry tool according to an embodiment of the presently disclosed subject matter.

The present subject matter provides devices and methods for gaining access to optical fibers contained within a fiber optic cable. In one aspect, the present subject matter provides a tube and cable entry tool. Referring to FIGS. 1A, 1B, and 2, the tube and cable entry tool, generally designated 100, can comprise a first jaw 110 and a second jaw 120 positioned opposing first jaw 110. To maintain first jaw 110 and second jaw 120 in this orientation relative to one another, tool 100 can further comprise a first grip handle 131 and a second grip handle 132 attached to first jaw 110 and second jaw 120, respectively. Specifically, for example, as shown in FIGS. 1A, 1B, and 2, first jaw 110 can be attached to one end of first grip handle 131, second jaw 120 can be attached to one end of second grip handle 132, and the opposing ends of first and second grip handles 131 and 132 can be connected to each other. In particular, first and second grip handles 131 and 132 can be hingedly connected at a pivot point 133. As shown in FIG. 2, pivot point 133 can be offset from a long axis of first and second grip handles 131 and 132 such that an open channel is formed between first and second grip handles 131 and 132 for receiving a buffer tube or cable to be cut.

In this configuration, first and second jaws 110 and 120 can be held in an opposing relationship with respect to each other but can be pivoted apart, such as to position a buffer tube between first and second jaws 110 and 120. Specifically, for example, first and second grip handles 131 and 132 can be pivoted apart such that first and second jaws 110 and 120 are spaced apart from each other, and a buffer tube or cable can be positioned between first and second jaws 110 and 120. Once the tube is in position, first and second grip handles 131 and 132 can be moved closer to one another such that first and second jaws 110 and 120 contact opposing sides of the tube. In this way, the tube or cable can be securely held between first and second jaws 110 and 120 while the tube or cable is cut.

In addition, referring to FIGS. 1A through 3, rather than being designed to receive a buffer tube or cable having only one particular size, first jaw 110 and second jaw 120 can be designed to receive and hold a buffer tube or cable having any of a variety of tube or cable diameters. Specifically, and for example and without limitation, first jaw 110 can have a first channel 112 formed therein that has a tapered or wedge-shaped profile adapted to cradle a buffer tube of any diameter, and second jaw 120 can likewise have a second channel 122 formed therein having a similarly tapered or wedge-shaped profile. In other words, first channel 112 and second channel 122 can each have a cross-sectional profile that can be substantially concave, with a width that becomes increasingly narrow at increasing depths. For instance, such a profile can be substantially V-shaped, substantially U-shaped, or it can be some other shape having a generally tapered profile.

In the configurations shown in FIGS. 1A through 3, for example, first channel 112 and second channel 122 can each have a substantially V-shaped profile. Those having ordinary skill in the art will recognize that the term "substantially V-shaped" is not limited to profiles having planar side walls tapering to a single apex, but should be understood to include any profile having a width that is substantially inversely proportional to the depth into the channel (i.e., wider near surface and narrowest at lowest point). In this configuration, as long as the diameter of the tube to be cut is within a range of diameters for which first and second jaws 110 and 120 are designed to receive (e.g., between about 4.75 mm and 18.5 mm), the tapered profile of first and second channels 112 and 122 can function to support and center the tube.

Tool 100 can further comprise a biasing element, generally designated 134, in communication between first and second grip handles 131 and 132. For example, biasing element 134 can be a spring that urges first and second grip handles 131 and 132 together. In this way, with first and second grip handles 131 and 132 in a "normally closed" position, biasing element 134 can assist a technician to press first and second grip handles 131 and 132 together to hold and support a buffer tube to be cut. Alternatively, biasing element 134 can bias first and second grip handles 131 and 132 in the opposite direction, urging them apart. In this way, with first and second grip handles 131 and 132 in a "normally open" position, a technician can easily position a buffer tube to be cut between first and second jaws 110 and 120 and can then press first and second grip handles 131 and 132 together against the biasing force of biasing element 134. In either arrangement, biasing element 134 can assist the user in one or more aspects of the operation of tool 100, which can be helpful for single-handed use of tool 100.

In another configuration, tool 100 can comprise a ratcheting mechanism (not shown) in communication between first and second grip handles 131 and 132. Such a ratcheting mechanism can be configured to allow movement of first and second grip handles 131 and 132 towards each other but prevent them from moving apart. In this way, a user can squeeze first and second grip handles 131 and 132 together to secure a buffer tube therebetween, and the ratcheting mechanism can maintain first and second grip handles 131 and 132 in this securing position (thus behaving similarly to a biasing element biased towards a "normally closed" position). As a result, the user can operate tool 100 without exerting additional pressure on first and second grip handles 131 and 132 to keep the tube secured therebetween.

To cut the outer wall and any protective layer(s) of the tube, one or both of first or second jaws 110 or 120 can comprise a cutting element. Specifically, referring to the configurations shown in FIGS. 1A, 1B, and 3, for example, first jaw 110 can comprise a first cutting element 114 that extends into first channel 112. For example, first cutting element 114 can extend into the center of first channel 112 such that it substantially bisects the tapered profile of first channel 112. Likewise, second jaw 120 can comprise a second cutting element 124 (e.g., a single- or double-edged blade) that extends into second channel 122 (e.g., into the center of second channel 122). First and second cutting elements 114 and 124 can be a straight razor or a double-edged blade depending on the desired functionality of tool 100 as described below.

Because tool 100 can be configured for gaining access to optical fibers contained within a fiber optic cable containing one or more buffer tubes having any of a variety of tube diameters and/or tube wall thicknesses, the positions of one or both of first and second cutting elements 114 and 124 can be adjustable to change the distance first and second cutting elements 114 and 124 extend into first and second channels 112 and 122, respectively. This adjustment can account for both the differences in positioning of the tube relative to the first and second channels 112 and 122 depending on the tube diameter and any differences in the thickness of the protective outer layers of the tube that surround the optical fibers.

Figure 4:
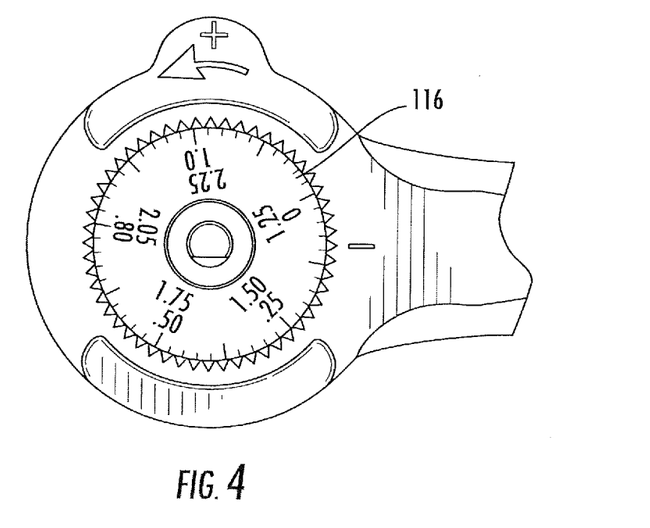
FIG. 4 is a top view of a blade depth adjustment mechanism of a tube and cable entry tool according to an embodiment of the presently disclosed subject matter.

To enable this adjustment of the positions of first and second cutting elements 114 and 124, tool 100 can comprise one or more adjustment mechanisms. Referring to FIGS. 2 and 4, for example, tool 100 can comprise a first depth adjustment mechanism 116 associated with first cutting element 114. In the particular configuration shown in FIGS. 2 and 4, first depth adjustment mechanism 116 can be a rotatable dial. In this arrangement, setting the depth of first cutting element 114 can involve rotating first depth adjustment mechanism 116 to a position corresponding to the desired blade depth, which can be determined based on known or measured characteristics of a buffer tube to be cut (e.g., diameter, wall thickness). In this way, the position of first cutting element 114 can be adjusted so that first cutting element 114 can penetrate a sufficient depth into an outer wall of an optical fiber buffer tube to cut an opening in the tube, but such a depth is not so great as to allow first cutting element 114 to damage or otherwise disrupt any optical fibers contained within the buffer tube. Likewise, tool 100 can comprise a second depth adjustment mechanism 126 (e.g., a second rotatable dial), which can be associated with second cutting element 124 for similarly setting the position of second cutting element 124. In this configuration, the tapered shape of first and second channels 112 and 122 can serve to center a buffer tube having any of a variety of diameters, and the positions of first and second cutting elements 114 and 122 can be adjusted (e.g., using first and second depth adjustment mechanisms 116 and 126) to compensate for the tube position and wall thickness.

Figure 3:
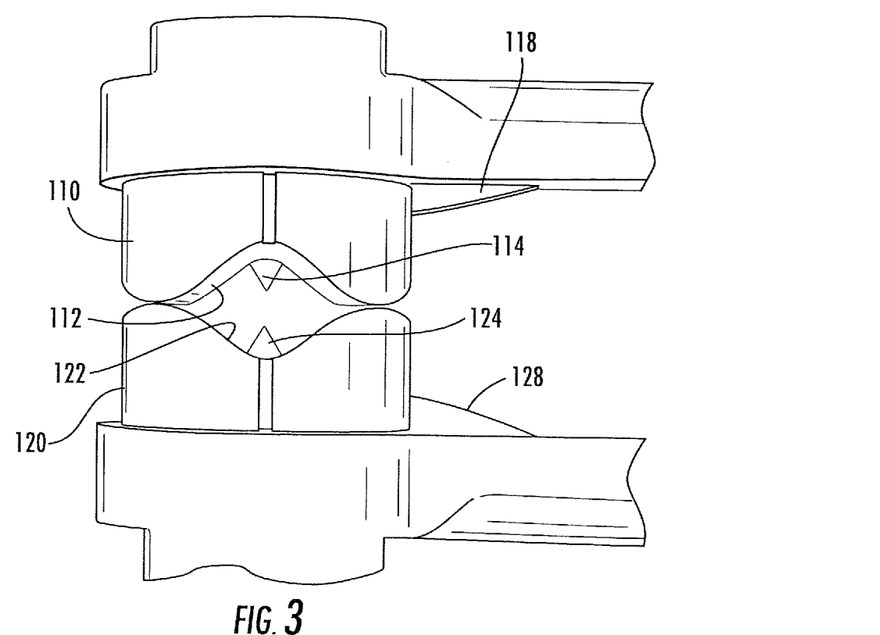
FIG. 3 is a side view of first and second jaws of a tube and cable entry tool according to an embodiment of the presently disclosed subject matter.

Furthermore, although FIGS. 1A, 1B, and 3 show first and second jaws 110 and 120 including a single blade each (i.e., first and second cutting elements 114 and 124, respectively), those having ordinary skill in the art should recognize that other numbers and combinations of cutting elements can be provided without departing from the spirit and essential characteristics of the present subject matter. For instance, rather than a single cutting element being provided with each of first and second jaws 110 and 120, a plurality of cutting elements can be provided to extend into one or both of first and second channels 112 and 122.

Although the depth that first and second cutting elements 114 and 124 extend in first and second channels 112 and 122, respectively, can be adjustable, the orientation of first and second cutting elements 114 and 124 can be otherwise substantially fixed. Specifically, for example, first and second cutting elements 114 and 124 can be oriented in a direction that is substantially parallel to a long axis of first and second grip handles 131 and 132, respectively. To allow for cable entry tool 100 to be used to make both longitudinal and radial cuts in the outer layers of a buffer tube, however, first and second jaws 110 and 120 can be movable to change the orientation of first and second channels 112 and 122 with respect to first and second cutting elements 114 and 124, respectively.

For instance, as shown in FIGS. 1A, 1B, and 3, first and second jaws 110 and 120 can be positioned such that first and second channels 112 and 122 are oriented substantially perpendicular to first and second cutting elements 114 and 124. In this position, a buffer tube supported between first and second channels 112 and 122 will likewise be oriented substantially perpendicular to first and second cutting elements 114 and 124. In this way, operation of cable entry tool 100 can result in a radial cut (i.e., "ring cut") of the tube. Alternatively, first and second jaws 110 and 120 can each be rotated (e.g., about 90 degrees) such that first and second channels 112 and 122 (and any tube supported therebetween) are oriented substantially parallel with first and second cutting elements 114 and 124. In this arrangement, operation of cable entry tool 100 can result in an axial/longitudinal cut of the tube.

Alternatively, each of first and second jaws 110 and 120 can comprise one or more additional channels that are aligned with predetermined operating positions. For instance, rather than first and second jaws 110 and 120 being movable between perpendicular and parallel orientations, two sets of tapered channels (e.g., V-shaped channels) can be formed in each of first and second jaws 110 and 120: one aligned substantially perpendicular to first and second cutting elements 114 and 124, and one aligned substantially parallel to first and second cutting elements 114 and 124 (See, e.g., FIG. 2). In this way, a technician needs to merely align a buffer tube to be cut with the set of channels corresponding to the kind of cut to be made without making any adjustments to the positioning of first and second jaws 110 and 120.

In yet a further alternative configuration, first and second jaws 110 and 120 can both be rotatable relative to first and second grip handles 131 and 132, respectively, and comprise a plurality of tapered channels (e.g., V-shaped channels). Rather than the multiple channels being associated with different operating positions, however, the different channels can be shaped and/or sized for use with different tube sizes and/or types. In this configuration shown in FIGS. 5A and 5B, for example, first jaw 110 can comprise a first large channel 112a and a first small channel 112b. First large channel 112a can be comparatively wider and/or can have a wider-angle profile compared to first small channel 112b. In this way, first large channel 112a can be adapted to accommodate buffer tubes having comparatively larger diameters, whereas first small channel 112b can be adapted to accommodate smaller tubes. Likewise, second jaw 120 can comprise a second large channel 122a and a second small channel 122b. In this configuration, cable entry tool 100 can be further able to accommodate buffer tubes having a wide range of tube diameters.

In this and other configurations where first and second jaws 110 and 120 are movable between operating positions, cable entry tool 100 can comprise one or more locking or restraint mechanisms to hold first and second jaws 110 and 120 in a desired orientation. Specifically, for example, as shown in FIGS. 2 and 3, cable entry tool 100 can comprise a first locking tab 118 (FIG. 3) in communication with first jaw 110 and movable to alternately allow rotation of first jaw 110 relative to first grip handle 131 and prevent such rotation. Specifically, for example, first locking tab 118 can be connected to first grip handle 131 (e.g., pivotably attached at a pivot point) and movable into engagement with first jaw 110 (e.g., into engagement with notches in first jaw 110 shown in FIGS. 1A-3). In a similar configuration, a second locking tab 128 (FIG. 2) can be provided in communication with second jaw 120 for preventing or restraining movement of second jaw 120 with respect to second grip handle 132.

In this configuration, if it is desired to rotate first jaw 110 between operating positions (e.g., between a perpendicular alignment for a radial cut and a parallel alignment for an axial cut), first locking tab 118 can be depressed to disengage first jaw 110. Once first locking tab 118 is disengaged, first jaw 110 can be rotated to the desired operating position. Once first jaw 110 is aligned with the desired operating position, first locking tab 118 can again be engaged with first jaw 110 to hold first jaw 110 in place. In addition, first locking tab 118 can be biased towards an engaged position such that once first jaw 110 is rotated to a predetermined operating position, first locking tab 118 can be urged into engagement with first jaw 110 to retain first jaw 110 in that position. Likewise, second locking tab 128 can be configured to interact with second jaw 120 in a similar manner.

Alternatively, those having skill in the art should recognize that rather than a movable locking element (e.g., first and second locking tabs 118 and 128) that can be engaged and disengaged from the jaws to allow or prevent their movement, cable entry tool 100 can comprise one or more detents positioned between first and second jaws 110 and 120 and first and second grip handles 131 and 132, respectively. Such detents can, for example, protrude from first and second grip handles 131 and 132 and can nest in recesses formed in a coupling surface of first and second jaws, respectively. Regardless of the specific configuration, however, such detents can resist movement of the respective jaws unless a force is applied that is sufficient to overcome the resistance.

Figure 5A:
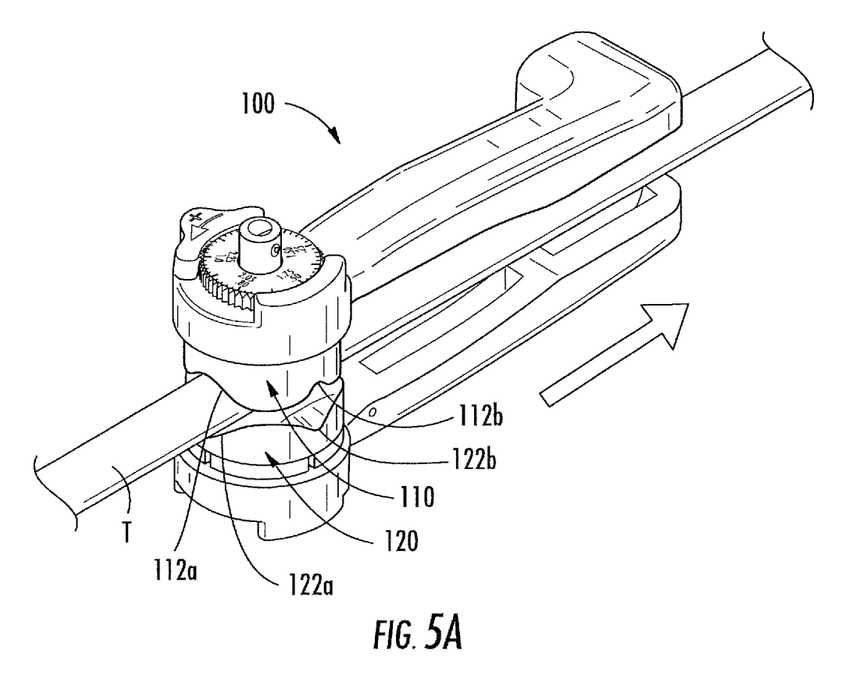
FIG. 5A is a perspective view of a tube and cable entry tool being used to perform an axial cut of a buffer tube according to an embodiment of the presently disclosed subject matter.
Figure 5B:
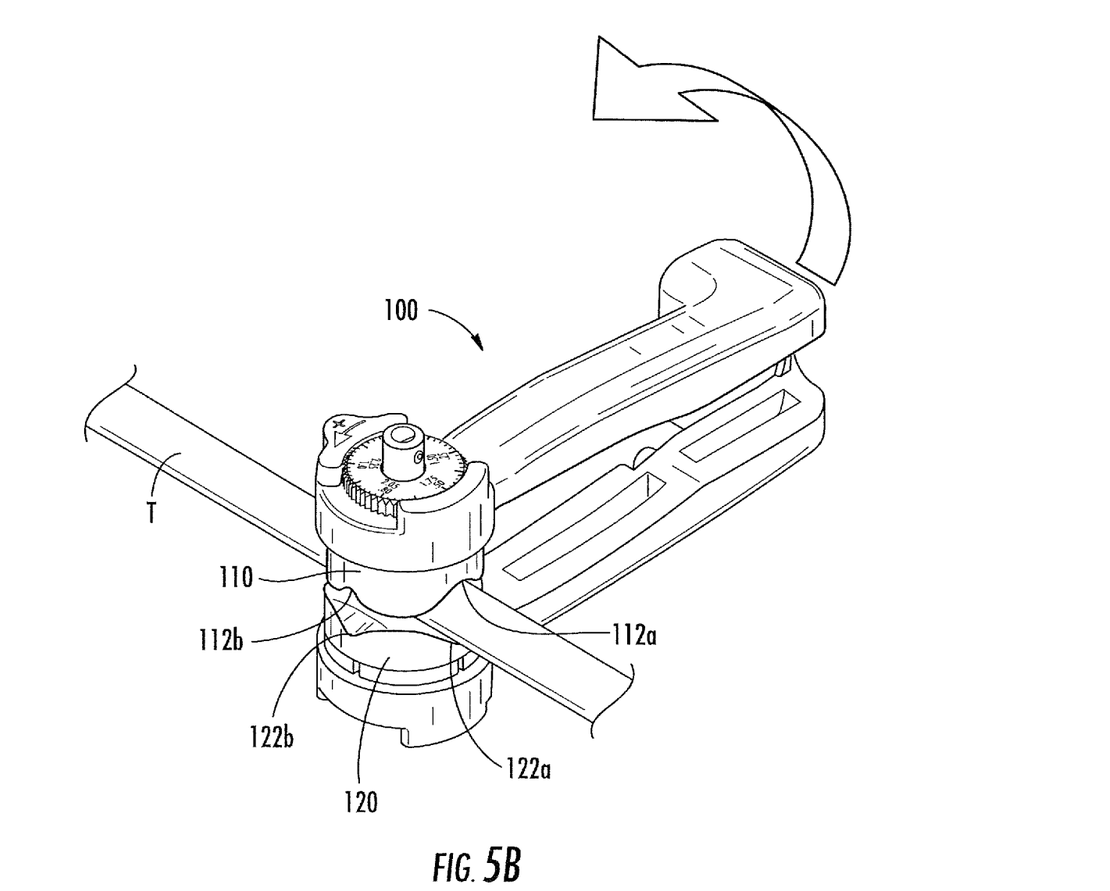
FIG. 5B is a perspective view of a tube and cable entry tool being used to perform a radial cut of a buffer tube according to an embodiment of the presently disclosed subject matter.

As noted above, with any of the configurations of first and second jaws 110 and 120 disclosed, cable entry tool 100 can be operated to create both radial/ring cuts of a buffer tube or cable and axial/longitudinal cuts. In one particular example, FIGS. 5A and 5B show operation of one configuration of tool 100. In this configuration, first and second jaws 110 and 120 can have a hybrid design in which they are both rotatable relative to first and second grip handles 131 and 132, respectively, and comprise multiple channels.

As shown in FIG. 5A, first and second jaws 110 and 120 can be positioned such that first and second large channels 112a and 122a are oriented substantially parallel with first and second grip handles 131 and 132 (and thus likewise with first and second cutting elements 114 and 124), respectively. For a given buffer tube or cable to be cut, such as tube T, the depths that first and second cutting elements 114 and 124 extend into first and second large channels 112a and 122a can be adjusted to a desired value based on the characteristics of tube T (e.g., using first and second depth adjustment mechanisms 116 and 126). Once tool 100 is configured in this way, tube T can be positioned between first large channel 112a of first jaw 110 and second large channel 122a of second jaw 120. As indicated above, pivot point 133 at which first and second grip handles 131 and 132 are connected can be offset with respect to a long axis of first and second grip handles 131 and 132. In this way, tube T can lie substantially collinear with first and second grip handles 131 and 132.

With tube T arranged in this position, first and second grip handles 131 and 132 can be squeezed together (with or without the assistance of a biasing element 134) such that tube T is securely supported between first and second jaws 110 and 120 and is centered or otherwise aligned with first and second cutting elements 114 and 124. Specifically, for example, tube T can be positioned such that first cutting element 114 and second cutting element 124 are oriented substantially parallel to tube T on diametrically opposing sides of tube T.

In this position, first and second cutting elements 114 and 124 can at least begin to pierce the wall and any outer layers of tube T. In particular, because first and second cutting elements 114 and 124 can be adjusted to particular depths based on known or measured characteristics of tube T, first and second cutting elements 114 and 124 can pierce only the wall and/or any outer protective layers of tube T without damaging the optical fibers contained therein. In addition, if first and second cutting elements 114 and 124 are double-edged blades as discussed above, tool 100 can be moved back and forth along tube T to more effectively penetrate the wall and/or any outer protective layer or layers of tube T. Tool 100 can further be pulled or pushed along tube T (or tube T can be pulled with respect to tool 100), such as in the direction of the arrow shown in FIG. 5A, to create a mid-span incision in tube T, thereby providing access to the optical fibers contained therein. Specifically, where first and second cutting elements 114 and 124 are oriented substantially opposing each other, tool 100 can create two parallel longitudinal cuts on diametrically opposing sides of tube T.

As shown in FIG. 5B, first and second jaws 110 and 120 can alternatively be positioned with first and second large channels 112a and 122a being oriented substantially perpendicular to first and second grip handles 131 and 132 (and thus likewise to first and second cutting elements 114 and 124), respectively. Tube T can be positioned between first large channel 112a of first jaw 110 and second large channel 122a of second jaw 120, and first and second grip handles 131 and 132 can be squeezed together such that tube T is securely supported between first and second jaws 110 and 120 and is centered or otherwise aligned with first and second cutting elements 114 and 124. Specifically, for example, tube T can be positioned such that first cutting element 114 and second cutting element 124 are oriented substantially perpendicular to tube T on diametrically opposing sides of tube T. In this position, first and second cutting elements 114 and 124 can pierce the wall and any outer protective layers of tube T. Rather than pulling tool 100 along the length of tube T, however, tool 100 can be rotated about tube T, such as in the direction of the arrow shown in FIG. 5B, to create a radial "ring" cut of tube T at that position. In particular, in the configuration in which first cutting element 114 and second cutting element 124 are positioned opposing each other, tool 100 can be rotated about 180 degrees about tube T to make a complete circumferential cut of tube T.

The present subject matter can be embodied in other forms without departure from the spirit and essential characteristics thereof. The embodiments described therefore are to be considered in all respects as illustrative and not restrictive. For example, although the above disclosure refers to entry into optical fiber-containing cables, those having skill in the art will appreciate that tool 100 can likewise be used for cable entry on softer jacketed cables, such as those used in the CATV and Data Center markets. In addition, with slight modifications to the shapes and designs of first and second jaws 110 and 120, tool 100 can further be used on flat drop cables used in outside plant FTTH deployments.

In fact, first and second jaws 110 and 120 can be configured to be detachable from first and second grip handles 131 and 132, respectively, wherein tool 100 can be adapted such that different configurations for first and second jaws 110 and 120 can be connected to tool 100 depending on the intended use. Further in this regard, an array of different configurations for detachable versions of first and second jaws 110 and 120 can be provided with tool 100 as a kit that can enable the use of tool 100 in a broad range of applications across various telecommunications markets.

Although the present subject matter has been described in terms of certain preferred embodiments, other embodiments that are apparent to those of ordinary skill in the art are also within the scope of the present subject matter.

What is claimed is:
1. A method for gaining access to optical fibers contained within a fiber optic buffer tube, the method comprising:
  positioning a buffer tube between a first jaw having a substantially V-shaped first channel formed therein and a second jaw having a substantially V-shaped second channel formed therein, the buffer tube being received by the first channel and the second channel;

operating a first depth adjustment mechanism to extend a first cutting element a first predetermined depth into the first channel;

operating a second depth adjustment mechanism to extend a second cutting element a second predetermined depth into the second channel;

pressing the first jaw and the second jaw together such that the first cutting element and the second cutting element penetrate substantially through an outer wall of the buffer tube; and moving the buffer tube with respect to the first and second cutting elements to cut the outer wall of the buffer tube.

2. The method of claim 1, comprising determining values of one or more of a diameter or a wall thickness of the buffer tube, wherein the first predetermined depth and the second predetermined depth are selected based on the values of the one or more of the diameter or the wall thickness of the buffer tube.

3. The method of claim 1, comprising, before positioning the buffer tube between the first jaw and the second jaw, rotating the first jaw and the second jaw to one of a first operating position in which the first channel and the second channel are oriented to be substantially parallel with the first cutting element and the second cutting element, respectively, or a second operating position in which the first channel and the second channel are oriented to be substantially perpendicular to the first cutting element and the second cutting element, respectively.

4. An entry tool for tubes and cables, the tool comprising:
a first jaw having a substantially V-shaped first channel and at least one additional substantially V-shaped channel;
a first cutting element extending from the first jaw into the first channel;
a first depth adjustment mechanism in communication with the first cutting element and operable to adjustably set a distance the first cutting element extends from the first jaw into the first channel;
a second jaw positioned opposing the first jaw and having a substantially V-shaped second channel and at least one additional substantially V-shaped channel; and
a second cutting element extending from the second jaw into the second channel;
a second depth adjustment mechanism in communication with the second cutting element and operable to adjustably set a distance the second cutting element extends from the second jaw into the second channel;
the first channel and the second channel being movable with respect to each other for receiving therebetween tubes or cables having a variety of different diameters.

5. The entry tool of claim 4, wherein the first jaw is rotatable relative to the first cutting element into at least a first position in which the first channel is oriented substantially parallel to the first cutting element and a second position in which the first channel is oriented substantially perpendicular to the first cutting element; and
wherein the second jaw is rotatable relative to the second cutting element into at least a first position in which the second channel is oriented substantially parallel to the second cutting element and a second position in which the second channel is oriented substantially perpendicular to the second cutting element.

6. The entry tool of claim 5, comprising:
a first locking mechanism in communication with the first jaw and operable to restrain movement of the first jaw relative to the first cutting element; and
a second locking mechanism in communication with the second jaw and operable to restrain movement of the second jaw relative to the second cutting element.

7. The entry tool of claim 4, wherein, when a buffer tube is received between the first channel and the second channel, the first jaw and the second jaw are adapted to be movable relative to the buffer tube such that the first cutting element and the second cutting element cut substantially opposing sides of the buffer tube.

8. The entry tool of claim 4, wherein one or both of the first cutting element or the second cutting element is a double-edged blade.

9. The entry tool of claim 4, comprising:
a first grip handle having a first end connected to the first jaw and a second end; and
a second grip handle having a first end connected to the second jaw and a second end connected to the second end of the first grip handle.

10. The entry tool of claim 9, wherein the first grip handle and the second grip handle are connected at their second ends by a hinge.

11. The entry tool of claim 10, wherein the hinge is offset with respect to a long axis of the first grip handle and the second grip handle.

12. The entry tool of claim 10, comprising a biasing element connected between the first grip handle and the second grip handle, the biasing element biasing the first grip handle and the second grip handle towards each other.

13. The entry tool of claim 9, wherein the first blade is oriented substantially parallel with a long axis of the first grip handle; and
wherein the second blade is oriented substantially parallel with a long axis of the second grip handle.

14. An entry tool comprising:
a first grip handle having a first end and a second end;
a second grip handle having a first end and a second end attached to the second end of the first grip handle;
a first jaw connected to the first end of the first grip handle, the first jaw having a first channel formed therein;
a first cutting element extending into the first channel, the first cutting element being oriented substantially parallel with a long axis of the first grip handle;
a first depth adjustment mechanism in communication with the first cutting element and operable to adjustably set a distance the first cutting element extends into the first channel;
a second jaw connected to the first end of the second grip handle and positioned opposing the first jaw, the second jaw having a second channel formed therein; and
a second cutting element extending into the second channel, the second cutting element being oriented substantially parallel with a long axis of the second grip handle;
a second depth adjustment mechanism in communication with the second cutting element and operable to adjustably set a distance the second cutting element extends into the second channel;
the first channel and the second channel being movable with respect to each other for separately receiving therebetween tubes or cables having a variety of different diameters.

15. The entry tool of claim 14, wherein the first grip handle and the second grip handle are connected at their second ends by a hinge.

16. The entry tool of claim 15, wherein the hinge is offset with respect to a long axis of the first grip handle and the second grip handle.

17. The entry tool of claim 14, wherein one or both of the first channel or the second channel is substantially V-shaped.

18. The entry tool of claim 14, wherein, when a buffer tube is received between the first channel and the second channel, the first jaw and the second jaw are adapted to be movable relative to the buffer tube such that the first cutting element and the second cutting element cut substantially opposing sides of the buffer tube.

19. The entry tool of claim 14, wherein the first jaw is rotatable relative to the first cutting element into at least a first position in which the first channel is oriented substantially parallel to the first cutting element and a second position in which the first channel is oriented substantially perpendicular to the first cutting element; and wherein the second jaw is rotatable relative to the second cutting element into at least a first position in which the second channel is oriented substantially parallel to the second cutting element and a second position in which the second channel is oriented substantially perpendicular to the second cutting element.

20. The entry tool of claim 14, comprising a biasing element connected between the first grip handle and the second grip handle, the biasing element biasing the first grip handle and the second grip handle towards each other.

21. The entry tool of claim 4, wherein one or both of the first depth adjustment mechanism or the second depth adjustment mechanism comprises a rotatable dial.

\* \* \* \* \*